(12) United States Patent
Scothern

(10) Patent No.: US 10,837,311 B2
(45) Date of Patent: Nov. 17, 2020

(54) SYSTEM TO DETERMINE A STATE OF A VALVE

(71) Applicant: ROLLS-ROYCE PLC, London (GB)

(72) Inventor: David P Scothern, Derby (GB)

(73) Assignee: ROLLS-ROYCE plc, London (GB)

( * ) Notice: Subject to any disclaimer, the term of this patent is extended or adjusted under 35 U.S.C. 154(b) by 640 days.

(21) Appl. No.: 15/585,514

(22) Filed: May 3, 2017

(65) Prior Publication Data

US 2017/0321570 A1   Nov. 9, 2017

(30) Foreign Application Priority Data

May 4, 2016   (GB) .................................. 1607791.9

(51) Int. Cl.
*G01N 27/90* (2006.01)
*F01D 21/00* (2006.01)
(Continued)

(52) U.S. Cl.
CPC .............. *F01D 21/003* (2013.01); *F02C 9/18* (2013.01); *F02C 7/047* (2013.01); *F05D 2220/32* (2013.01); *F05D 2260/80* (2013.01); *F05D 2270/301* (2013.01); *F05D 2270/3015* (2013.01); *F05D 2270/46* (2013.01)

(58) Field of Classification Search
CPC ...... F02D 41/221; F02D 41/22; F02D 41/107; F02F 2041/001; F02C 7/268; F16K 37/0091
See application file for complete search history.

(56) References Cited

U.S. PATENT DOCUMENTS 10,082,445 B2 * 9/2018 Djebali .................. F02C 7/268
2010/0083667 A1   4/2010 Franconi
(Continued)

FOREIGN PATENT DOCUMENTS

| EP | 0 190 943 A2 | 8/1986 |
|---|---|---|
| WO | 2014/182289 A1 | 11/2014 |
| WO | 2015/019010 A1 | 2/2015 |

OTHER PUBLICATIONS

Oct. 2, 2017 extended Search Report issued in European Patent Application No. 17169041.5.
(Continued)

*Primary Examiner* — Mohamed Charioui
*Assistant Examiner* — Christine Y Liao
(74) *Attorney, Agent, or Firm* — Oliff PLC

(57) ABSTRACT

A valve monitoring apparatus has a system to determine a state of a valve. The system determines a fluid flow first pressure at a first location within a gas turbine engine, and a second pressure of a compressed fluid at a second location within the engine when the valve is in the first position; and compares the first and second pressures to determine the valve state. The system is arranged to command the valve to move from the first position towards a second position; determine the second pressure of the compressed fluid at the second location; compare the pressure at the second location when the valve is in the first position to the pressure at the second location when the valve has been commanded to move towards the second position; and, determine whether the valve has moved from the first position towards the second position when commanded to do so.

15 Claims, 3 Drawing Sheets

(51) Int. Cl.
F02C 9/18 (2006.01)
F02C 7/047 (2006.01)

(56) References Cited

U.S. PATENT DOCUMENTS

2016/0010541 A1   1/2016   Wang et al.
2016/0201572 A1*  7/2016   Clauson .............. F16K 37/0091
                                                                73/47
2016/0312728 A1* 10/2016   Ge ........................ F02D 41/107

OTHER PUBLICATIONS

Sep. 22, 2016 Search Report issued in Great Britain Patent Application No. 1607791.9.

* cited by examiner

SYSTEM TO DETERMINE A STATE OF A VALVE

TECHNOLOGICAL FIELD

The present disclosure relates to a system to determine a state of a valve and valve monitoring apparatus.

BACKGROUND

The gas turbine engine is known to comprise compressor systems, the compressor system comprising a fan and stages of rotating blades and static vanes known as stators. The primary purpose of the compressor is to increase the pressure of fluid through the gas turbine core. The compressor may then deliver this compressed fluid to the combustion system. Thus, ambient fluid is drawn into the compressor system, often at temperatures at or below freezing when subjected to cold environments or operation at high altitude. Anti-icing systems are used to heat various stages of the gas turbine engine to prevent ice from developing on compressor components.

BRIEF SUMMARY

According to a first aspect, there is provided a system to determine a state of a valve, the system comprising a controller configured to: determine a first pressure of a fluid flow at a first location within a gas turbine engine; determine a second pressure of a compressed fluid at a second location within the gas turbine engine when the valve is in the first position; compare the first pressure and the second pressure to determine the state of the valve; command the valve to move from the first position towards a second position; determine the second pressure of the compressed fluid at the second location; compare the pressure at the second location when the valve is in the first position to the pressure at the second location when the valve has been commanded to move towards the second position; and, determine whether the valve has moved from the first position towards the second position when commanded to do so.

Thus, in this way, the state of the valve may be detected as part of a check. The system is configured to determine the state of the valve when in the first position, so determining whether the valve is closed or at least partially open when the valve is in the first position. The system is also configured to determine whether the valve is closed, partially open or substantially open when the valve is in the first position, depending on the sensitivity of the system.

The system may be configured to determine the state of the valve when in the second position, so determining whether the valve is closed or at least partially open when the valve is in the second position. The system is also configured to determine whether the valve is closed, partially open or substantially open when the valve is in the second position, depending on the sensitivity of the system.

Thus, in this way, the state of the valve when in the first and/or second position may be detected as part of a valve operability check. Advantageously, the step to compare the pressure at the second location when the valve is in the first position to the pressure at the second location provides the ability to determine whether the valve has changed state when commanded to do so. Thus, the system provides the ability to monitor the both the state of the valve and the operability of the valve during a check. Should the valve fail or stick during use or as part of a check, the system advantageously provides the ability to determine an error in valve operability, along with an ability to determine whether the valve is stuck open or stuck closed.

Optionally, the second location comprises a bleed line. The second location may be a fluid flow. The fluid flow at the second location may be contained within a recess, orifice, cylinder, channel or chamber including, for example, a bleed line. The bleed line may direct a portion of fluid away from the fluid flow or compressed fluid.

Optionally, the step to compare the pressure at the second location when the valve is in the first position to the pressure at the second location when the valve has been commanded to move towards the second position may comprise steps to determine a change in pressure within the bleed line.

The change in pressure within the bleed line, as detected by the sensor, may signify that the valve is changing state when commanded to do so. Monitoring the rate of change in pressure over a given time period and/or determining whether the valve actuates within a predetermined success criterion, may advantageously allow further determination of valve condition. Such monitoring may be completed by a suitable controller or data processor located within, for example, an anti-icing system. Such monitoring may also be completed by any such suitable controller or data processor which is external to the system, and which is capable of receiving data from the system.

Optionally, the system may be configured to declare a fault condition if the change in pressure within the bleed line is about zero.

The controller may be configured to monitor the pressure difference between readings of pressure received from the second sensor. Should the difference in pressure readings received from the second sensor when the valve is in the first and/or second position be close to or equal zero, or not reflect expected pressure readings, the controller may declare a fault condition. A fault condition may be reported if the valve fails to change state during use, or as part of the check. Alternatively, a fault condition may be declared if the recorded difference in pressure is below a predetermined percentage or fraction of the expected difference in pressure, or if the actual pressure readings are not in accordance with the expected readings required as part of the test. Thus, the controller may analyse the result and declare a fault condition if the pressure difference does not satisfy a predetermined success criterion or detection threshold.

Optionally, the system may be additionally configured to declare a fault condition if a change in pressure difference between the pressure at the first location and the pressure at the second location is about zero.

Should the difference in pressure readings received from the second sensor when the valve is in the first and/or second position change the engine's operation, zero pressure change in the bleed line could, under certain operational conditions, represent a successful test. An additional or alternate test could be to declare a fault condition based on pressure difference change between the pressure at the first location and the pressure at the second location, providing a more robust test when monitoring pressure change.

Optionally, the controller may be additionally configured to measure an initial fluid pressure at a third location within a gas turbine engine; and, determine the first pressure from the initial fluid pressure.

The first pressure may represent a derived or actual figure resulting from observed data. Thus, the additional step of deriving a theoretical first pressure from an initial pressure reduces system complexity and the need for additional sensors to be mounted within the gas turbine engine. Additionally, the initial fluid pressure may be representative of any area within the gas turbine engine which is sensitive to environmental or ambient conditions. Such data may be representative of conditions at entry into the gas turbine engine, allowing additional environmental and/or operational sensitivity, and the ability to correct or compare data where required.

Optionally, the bleed line may be configured to extend from a compressor exit flow to a component.

The compressed fluid is removed from a flow which is sufficiently heated to provide a heating effect to the components comprised within the system, without removing large amounts of power from the engine, or overheating the components within the system. The compressor exit flow may be an intermediate pressure compressor exit flow. The component may be an engine section stator stage. Furthermore, the valve may be configured within the bleed line which may be located within the gas turbine engine. The valve may allow or prevent flow from a compressor exit flow towards the engine section stator stage when commanded to do so by the controller. The compressor exit flow may be the intermediate pressure compressor exit flow.

Optionally, the system may comprise a first sensor within a fluid flow at a first location within a gas turbine engine configured to measure the first pressure, the first sensor being in communication with the controller.

The first sensor may be configured to measure an initial or first pressure within the gas turbine engine. The first pressure may represent a derived or an actual figure resulting from observed data. The additional step of deriving a theoretical first pressure from an initial pressure reduces system complexity and the need for additional sensors to be mounted within the gas turbine engine.

Optionally, the system may comprise a second sensor at a second location within the gas turbine engine configured to measure the pressure at the second location, the second sensor being in communication with the controller.

The second sensor may be configured to measure a second pressure within the gas turbine engine when the valve is in the first and/or second position. The first and second sensors may be in communication with the controller in order to analyse or determine one or more of the pressure at the first and second locations, the pressure difference, or the change in the pressure difference between the first and second locations during operation. The sensors may be in electrical contact with the controller, or the controller may be external to the system.

Optionally, the controller may be configured to declare a fault condition if a difference between the pressure at the second location when the valve is in a first position and when the valve is in a second position is about zero.

Optionally, the controller may be configured to declare a fault condition if a change in pressure difference between the pressure at the first location and the pressure at the second location is about zero.

Optionally, the controller may be configured to determine the first pressure from an initial fluid pressure at a third location within the gas turbine engine.

Optionally, the bleed line may be configured to extend from a compressor exit flow to a component.

The compressor exit flow may be an intermediate pressure compressor exit flow. The component may be an engine section stator stage.

According to a second aspect, there is provided a gas turbine engine comprising a bleed line; a valve within the bleed line to control flow therethrough; a first pressure sensor within the gas turbine engine; a second pressure sensor within the bleed line; and, a controller configured to receive a first pressure reading from the first pressure sensor and a second pressure reading from the second pressure sensor, the controller being configured to perform the steps according to the first aspect.

According to a second aspect, there is provided a system to determine a state of a valve, the system comprising a controller comprising a processor, the processor being configured to function as a determining module to make a comparison between values and: determine a first pressure of a fluid flow at a first location within a gas turbine engine; determine a second pressure of a compressed fluid at a second location within the gas turbine engine when the valve is in the first position; compare the first pressure and the second pressure to determine the state of the valve; command the valve to move from the first position towards a second position; determine the second pressure of the compressed fluid at the second location; compare the pressure at the second location when the valve is in the first position to the pressure at the second location when the valve has been commanded to move towards the second position; and, determine whether the valve has moved from the first position towards the second position when commanded to do so.

According to a fourth aspect, there is provided a method to determine a state of a valve when the valve is in a first position, the method comprising steps to determine a first pressure of a fluid flow at a first location within a gas turbine engine; determine a second pressure of a compressed fluid at a second location within the gas turbine engine when the valve is in the first position; compare the first pressure and the second pressure to determine the state of the valve; command the valve to move from the first position towards a second position; determine the second pressure of the compressed fluid at the second location; compare the pressure at the second location when the valve is in the first position to the pressure at the second location when the valve has been commanded to move towards the second position; and, determine whether the valve has moved from the first position towards the second position when commanded to do so.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION

Embodiments will now be described by way of example only, with reference to the Figures, in which.

DETAILED DESCRIPTION

In the following description, the terms 'connected' and 'coupled' mean operationally connected and coupled. It should be appreciated that there may be any number of intervening components between the mentioned features, including no intervening components.

Figure 1:
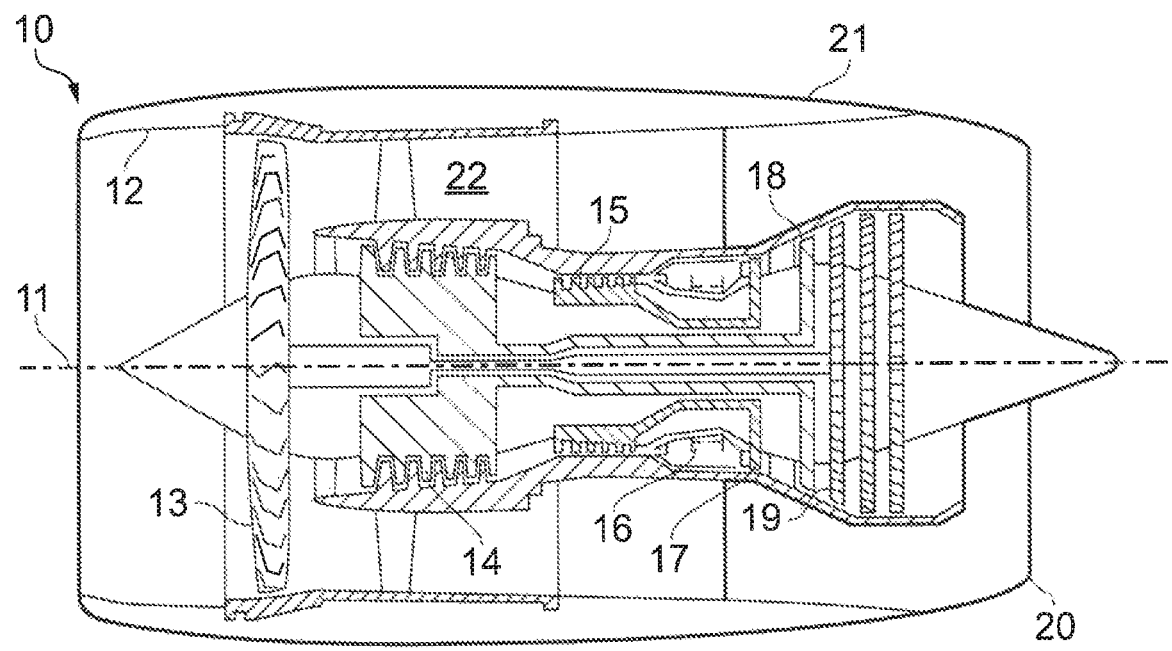
FIG. 1 illustrates a cross-sectional side view of a gas turbine engine according to various examples.

With reference to FIG. 1, a gas turbine engine is generally indicated at 10, having a principal and rotational axis 11. The engine 10 comprises, in axial flow series, a fluid intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The engine 10 works in the conventional manner so that fluid entering the intake 12 is accelerated by the fan 13 to produce two fluid flows: a first fluid flow into the intermediate pressure compressor 14 and a second fluid flow which passes through a bypass duct 22 to provide propulsive thrust. The intermediate pressure compressor 14 compresses the fluid flow directed into it before delivering that fluid to the high pressure compressor 15 where further compression takes place. In the described example of an engine 10, the fluid 64 is air. In further examples, the fluid can vary in composition according to specific use and environment.

The compressed fluid exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft. The operation of the engine 10, inclusive of the delivery of fuel and combustion thereof, are controlled by electronic engine control apparatus 31.

Other engines 10 to which the present disclosure could be applied could have alternative configurations. Such engines may have an alternative number of interconnecting shafts (e.g. two) and/or an alternative number of compressors and/or turbines. Further the engine may comprise a gearbox provided in the drive train from a turbine to a compressor and/or fan.

Some engines 10 include anti-icing functions designed to prevent or mitigate/reduce ice formation due to water droplets freezing on one or more component surfaces either before or after operation. Such components include, for example, the intermediate pressure compressor 14 and engine section stators 22 located towards the cooler frontal regions of the engine 10. In situations where ice formation is likely to occur, for example, during cold ambient or operating conditions, cruise or descent of the aircraft, a supply of anti-icing fluid to the component 62 may be activated to warm the component 62 and either melt the developed ice, or prevent its further formation. Such anti-icing functions protect the engine core in situations where ice is likely to accrete by preventing ice from being drawn into the engine 10. Supply of anti-icing fluid 64 to the component 62 is activated, for example, following a change in operational conditions which result in an increased potential for ice formation. Such changes may include engine 10 inlet temperatures, engine or power rating, altitude, ambient temperature/conditions, and speed relative to one or more of the ground and the air.

Figure 2:
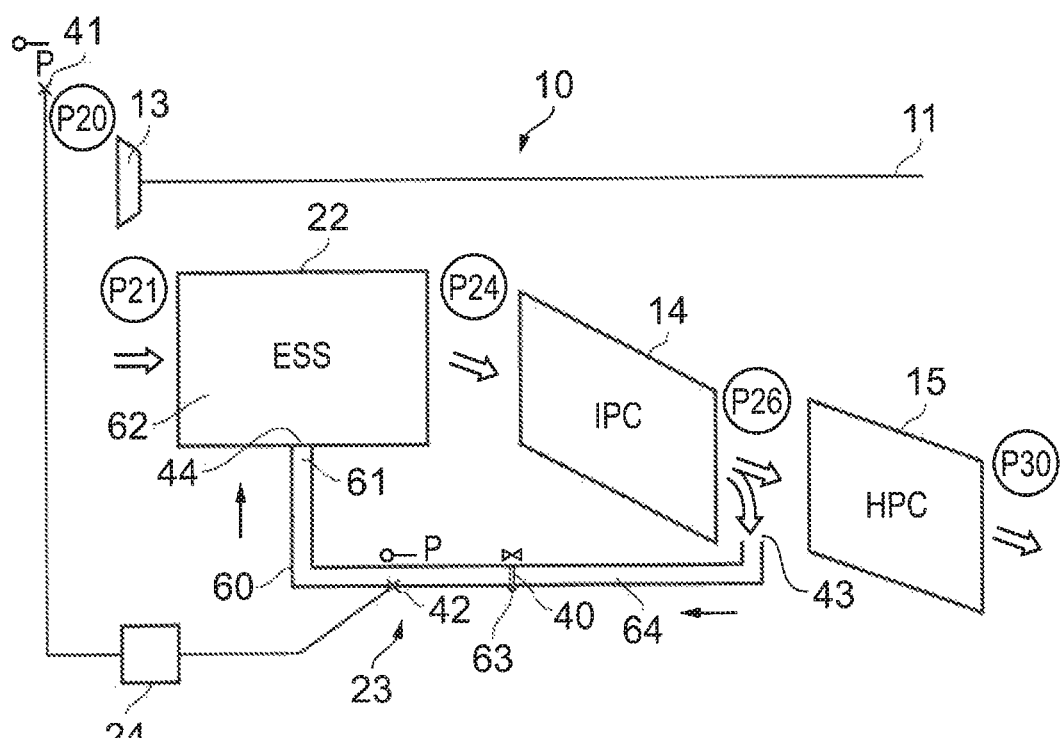
FIG. 2 illustrates a cross-sectional side view of a gas turbine engine according to various examples.

FIG. 2 shows a schematic diagram of an anti-icing system 23 configured to provide a pressurised and/or heated fluid 64 to a component 62 by removing fluid 64 from a fluid flow. FIG. 2 shows P20 pressure towards the front of the engine 10 describing low pressure compressor 13 inlet total pressure also termed fan entry pressure, P21 pressure describing fan root delivery pressure, P24 pressure showing intermediate pressure compressor 14 inlet total pressure, and P26 pressure showing high pressure compressor 15 inlet total pressure, which depending on engine configuration, is often approximately equivalent to intermediate pressure compressor 14 exit pressure. Additionally, FIG. 2 shows the intermediate pressure compressor 14 stage, the engine section stator 22 and high pressure compressor 15 stages, and their relation to pressures P20, P21, P24 and P26.

In the example shown in FIG. 2, the fluid 64 is compressed and heated by passing through one or more compression stages. The fluid 64 is diverted from a region between the intermediate pressure compressor 14 outlet and high pressure compressor 15 inlet. However, sufficiently compressed and/or heated fluid 64 can alternatively be diverted from one or more further locations within the engine 10. FIG. 2 also shows that the fluid 64, once removed from the fluid flow, is fed into a component 62.

The fluid 64 is fed into the component 62 via a bleed line 60. In some arrangements, a manifold 61 is additionally attached to the bleed line 60 between two or more components 62 and the bleed line 60. The manifold 61, if attached to the bleed line 60, serves to provide the bleed line 60 with two or more outlets so that the fluid 64 can flow into two or more components 62 susceptible to ice formation located within or adjacent to the gas turbine engine 10.

Figure 5:
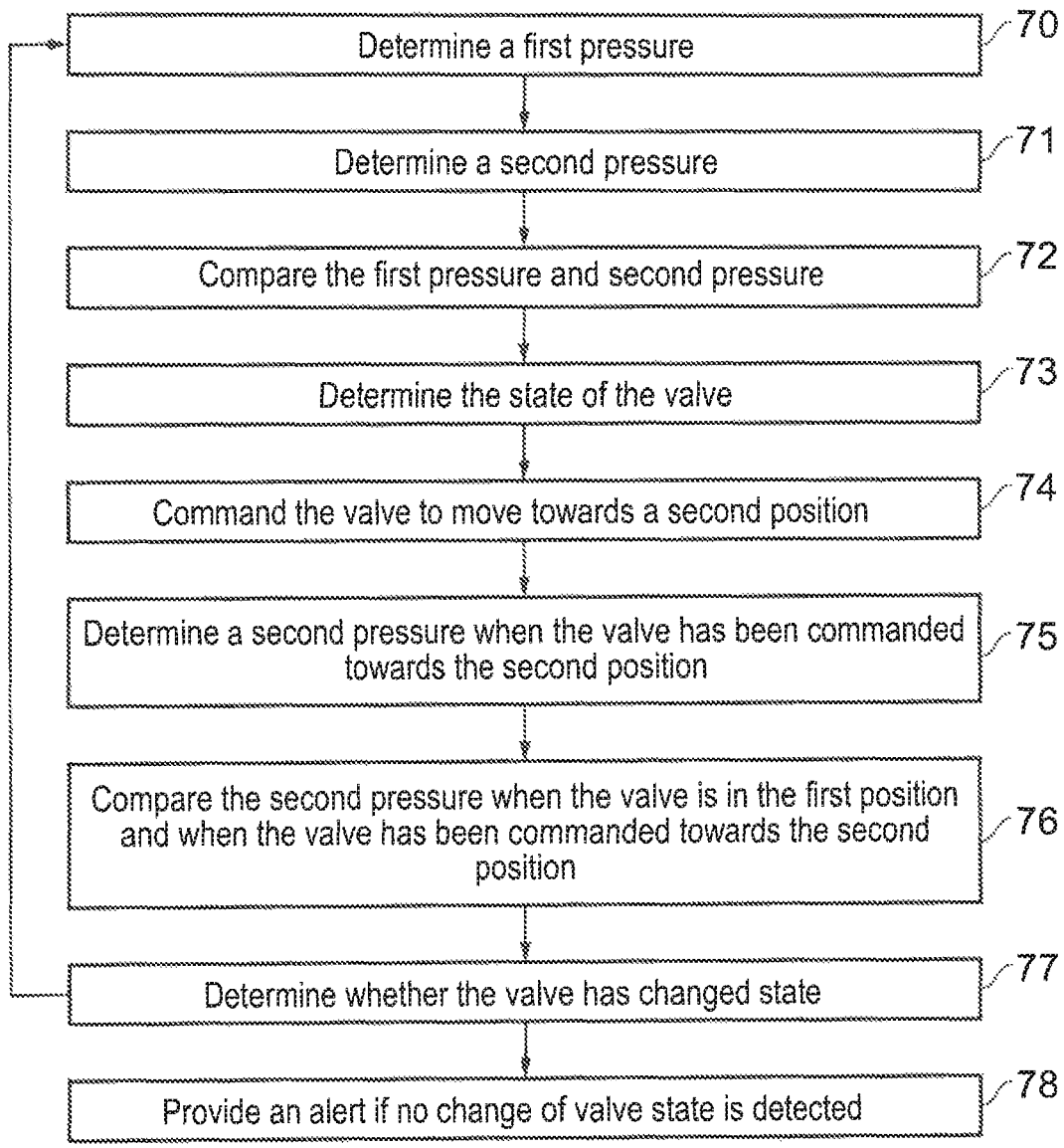

As shown in FIG. 2, the system includes a controller 24. In some examples, controller 24 may e a module. As used herein, the working 'module' refers to a device or apparatus where one or more features are included at a later time and, possibly, by another manufacturer or by an end user. The controller 24 may comprise any suitable circuitry to cause performance of the steps described herein and as illustrated in FIG. 5. The controller 24 may comprise: control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU), to perform the steps described herein and as illustrated in FIG. 5.

In various examples, the controller 24 may comprise at least one processor 25. Additionally or alternatively, the controller 24 may comprise at least one memory (not shown). The memory may store a computer program comprising computer readable instructions that, when read by the processor 25, causes performance of the methods described herein, and as illustrated in FIG. 5. The computer program may be software or firmware, or may be a combination of software and firmware.

The processor 25 may be located on the gas turbine engine 10, or may be located remote from the gas turbine engine 10, or may be distributed between the gas turbine engine 10 and a location remote from the gas turbine engine 10. The processor 25 may include at least one microprocessor and may comprise a single core processor, may comprise multiple processor cores (such as a dual core processor or a quad core processor), for may comprise a plurality of processors (at least one of which may comprise multiple processor cores).

The memory may be located on the gas turbine engine, or may be located remote from the gas turbine engine, or may be distributed between the gas turbine engine and a location remote from the gas turbine engine. The memory may be any suitable non-transitory computer readable storage medium, data storage device or devices, and may comprise a hard disk and/or solid state memory (such as flash memory). The memory may be permanent non-removable memory, or may be removable memory (such as a universal serial bus (USB) flash drive or a secure digital card), The memory may include; local memory employed during actual execution of the computer program; bulk storage; and cache memories which provide temporary storage of at least some computer readable or computer usable program code to reduce the number of times code may be retrieved from bulk storage during execution of the code.

The computer program may be stored on a non-transitory computer readable storage medium. The computer program may be transferred from the non-transitory computer readable storage medium to the memory. The non-transitory computer readable storage medium may be, for example, a USB flash drive, a secure digital (SD) card, an optical disc (such as a compact disc (CD), a digital versatile disc (DVD) or a Blu-ray disc). In some examples, the computer program may be transferred to the memory via a wireless signal or via a wired signal.

It should be appreciated that the method illustrated in FIG. 5 may be performed 'offline' on data which has been measured and recorded previously. Alternatively it may be performed in 'real-time', that is, substantially at the same time that the data is measured. In this case, the controller 24 may be coupled to the gas turbine engine 10 and may be an electronic engine controller or another on-board processor. Where the gas turbine engine 10 powers an aircraft, the controller 24 may be an engine controller, a processor on-board the gas turbine engine 10, or a processor on-board the aircraft.

Referring again to FIG. 2, a valve 40 and second sensor 42, also termed the anti-icing sensor 42, are located within the bleed line 60, the valve 40 comprising a valve actuator 63 for actuating between a first position and a second position. The valve 40 is arranged between the bleed line entry position, also known as a system source 43, and the component entry position, also known as a system sink 44. The second sensor 42 is located within the bleed line 60 downstream of the valve, between the valve 40 and the system sink 44. In further examples, the second sensor 42 is located within the manifold 61. Alternatively, two or more second sensors 42 are located within the bleed line 60, at least one second sensor being located within the bleed line 60 on either side of the valve 40. In each case, each second sensor 42 provides pressure measurements to the system controller 24 so that the system controller 24 interprets one or more of the pressure within the bleed line 60 downstream of the valve 40, the pressure in an engine section stator anti-icing manifold 61 downstream of the valve 40, or the pressure delta across the valve 40 i.e. between the valve 40 and the component 62 to be heated. Additionally, multiple second sensors 42 could be used on one or more sides of the valve 40 to provide greater data reliability and an indication of operational disparity, so indicating the operational state of one or more sensors 42 by reference to one or more neighbouring sensors.

In some examples, the first position of the valve 40 represents an open position and the second position represents a closed position, although alternate positions may be envisaged. The second sensor 42 is configured to monitor the pressure within the bleed line 60 when the valve 40 is in a closed or at least partially open configuration. The valve 40 is configured to allow the fluid 64 to flow through the bleed line 60 from the system source 43 to the system sink 44 when the valve 40 is in an open position. Conversely, the valve 40 is also configured to prevent flow through the bleed line 60 when the valve 40 is in a closed position. Thus, the valve 40 performs the function of turning the anti-icing system 23 on and off respectively.

If the valve 40 fails open, one or more components 62 within or adjacent to the anti-icing system 23 are exposed to warm fluid 64 which can be detrimental to the longevity of the components 62 included within the anti-icing system 23 or surrounding electrical components. Such components 62 may be susceptible to an increased likelihood of fatigue crack growth and/or the occurrence of creep due to components being subjected to increased loading at high temperatures. The anti-icing valve 40 failing open can also have a detrimental effect on the efficiency of particular operations or the overall specific fuel consumption of the engine 10 due to the extraction of fluid 64 from the fluid flow when it is not required.

If the anti-icing valve 40 fails closed, the supply of fluid 64 to the one or more components 62 included within the anti-icing system 23 is interrupted, meaning that the engine core is unprotected against ice formation. This may lead to one or more irregular operating conditions including rollback (i.e. uncommanded reduction in thrust), engine surge, flameout, or damage to one or more further components located within the engine 10 as a result of ice entering the engine 10 core. Such components may include the intermediate pressure compressor 14 and high pressure compressor 15.

When the valve 40 is operational, an observed change or delta in pressure within the bleed line 60 when moving the valve 40 between a first position and a second position confirms that the valve 40 is moving following a command to do so. Thus, the observation of a pressure delta by the second sensor 42 when moving the valve 40 between a first and second position provides confirmation of valve function. The first position may be one of an open or closed position. The second position may be a closed or open position, depending on the respective configuration of the valve when in the first position. Thus, the first or second position relates to the valve being fully open or fully closed, or any respective position therebetween. When testing the valve 40 by cycling between an open and closed position, a lack of pressure change detected by the valve 40 indicates that the valve 40 is stuck in one of an open, partly open, partly closed, or closed configuration, or that the anti-icing system 23 is not operating correctly.

Figure 3:
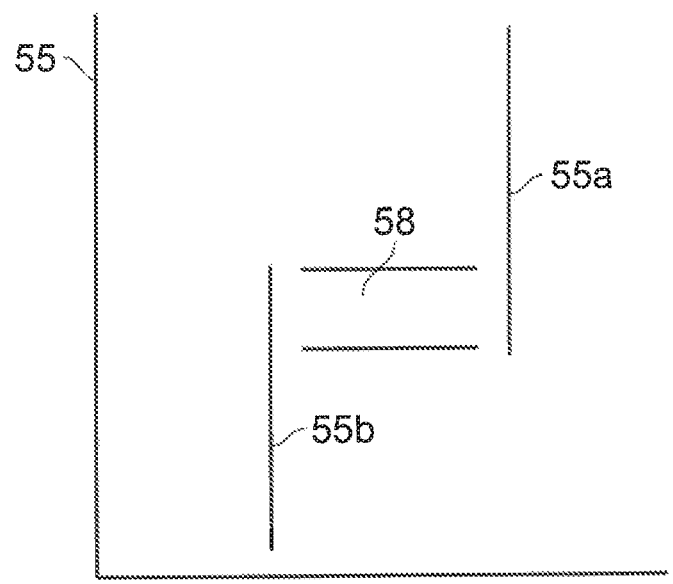
FIG. 3 illustrates a chart showing second pressure of fluid within a bleed line against state of the valve according to various examples.

FIG. 3 shows a plot of fluid pressure within the bleed line 60 between the valve and the system sink, as measured by the second sensor 42. This is plotted against the state of the valve on the x-axis, described as valve open 55a and valve closed 55b. Here, the fluid pressure within the bleed line 60 between the valve and the system sink is also known as the second pressure 55. As the test is carried out at ground idle engine conditions when operational engine 10 and ambient pressures are low, the pressure change to be measured is small. To avoid aliasing the signature of the valve transition with other engine events, such as operation of the engine or dispatch of an aircraft, the test is aborted if the engine departs from steady state operation. Such departures from steady state operation can, in some instances, be provided by changes in bleed valve 40 state or accessory power. Furthermore, at ambient or low-pressure conditions, an overlap 58 in second pressure 55 is shown in FIG. 3 where the valve 40 could be interpreted by the system controller 24 as being either open or closed. Such an overlap gives rise to uncertainty when diagnosing valve 40 operability.

When at idle conditions, the small difference between system source 43 and system sink 44 pressures is problematic when carrying out the test at different ambient conditions. Such variation may occur between high altitude and low altitude airports where the difference in ambient conditions can alter the measured pressures by more than the pressure delta ordinarily seen when actuating the valve 40. Thus, it is not possible to determine whether the absence of a pressure change indicates that the valve 40 is stuck in an open or closed configuration. As the dispatch restrictions in either case differ, it is desirable to be able to determine the state of the valve 40 following the test. The ability to determine the state of the valve 40 allows determination of whether the valve 40 is stuck open or stuck closed. Thus, the state of the valve indicates whether the valve is closed or at least partially open when the valve is in either or both of the first position or second position. In some examples, the state of the valve may indicate whether the valve is closed, partially open or substantially open when the valve is in either or both of the first position or second position, depending on the sensitivity of the system.

Referring again to FIG. 2, the positioning of the second sensor 42 downstream of the control valve 40 provides an improved signal with fewer sources of variation during normal use. However, a disadvantage of locating the second sensor 42 downstream of the control valve 40 is that the measured change in second pressure 55 when the valve 40 is open and/or closed will be low, particularly when the engine is operating at idle conditions. Upstream of the valve 40, between the system source 43 and the valve 40, the pressure within the bleed line 60 varies with system source 43 fluid pressure and may be affected by fluid offtake from the compressed fluid to drive external accessories. Such accessories can include hydraulics or further power systems which can change demand without warning.

In addition to the second sensor 42, a first sensor 41 is located within the fluid flow entering the engine 10, the first sensor 41 being configured to monitor the pressure within the fluid flow prior to the compression stage. The first sensor 41 is preferably located remotely or indirectly within the fluid flow, such as in a bore hole or bleed line fluidly connected to the fluid flow entering the engine 10 prior to the compression stage. The incorporation of a further parameter into the test enables comparison of second pressure 55 with a first pressure 54 obtained from the first sensor 41.

The first 54 and second 55 pressure values measured by or derived from the first sensor 41 and second sensor 42 respectively, are fed into the system controller 24 for comparison and/or further analysis. The first sensor 41 provides data to the controller 24 in its actual state in order to determine a first pressure value 54. Alternatively, data from the first sensor 41 can be used to determine the pressure of one or more further locations within the engine 10, the determined pressure of the further fluid flow describing the first pressure 54. Thus, the first pressure 54 represents either an actual or derived value for pressure representing a known or theoretical working condition within the engine 10.

The first pressure 54 can be determined through calculation or derivation, or from one or more of a known initial pressure 53, temperature or volume. Additionally or alternatively, the values used to calculate, derive or correlate the first pressure 54, such as the initial pressure 53, can also be determined by respective sensors and associated control systems. Thus, the first pressure 54 can be derived using, for example one or more of P20, LPC inlet total temperature T20, fan speed, fan geometry or fan configuration. Alternatively, the first pressure 54 can be numerically derived from P20, T20 and fan speed using one or more gas laws or equations associating pressure, temperature and volume.

By comparing the second pressure 55 with the first pressure 54, the test determines whether the valve 40 is operational, that is cycling between open and closed with a corresponding change in observed pressure. Alternatively, the test determines that the valve 40 is stuck, so as to not cycle between a position which is perceived by the valve actuation system to be open or closed with little or no change in observed pressure. The test additionally determines whether the valve 40 is stuck in an open configuration, or stuck in a closed configuration.

As shown in FIG. 2, the first pressure 54 may be the IP compressor entry P24 pressure. By introducing the further parameter of first pressure 54 into the test so that the controller compares the first 54 and second 55 pressures, the test determines whether the valve 40 is closed, partially open, and/or open according to one or more predetermined rules. Data gathered from engine testing shows that the pressure in the anti-icing system downstream of the control valve 40 is closely related to the pressure at the system sink, shown in FIG. 2 as P24.

Figure 4:
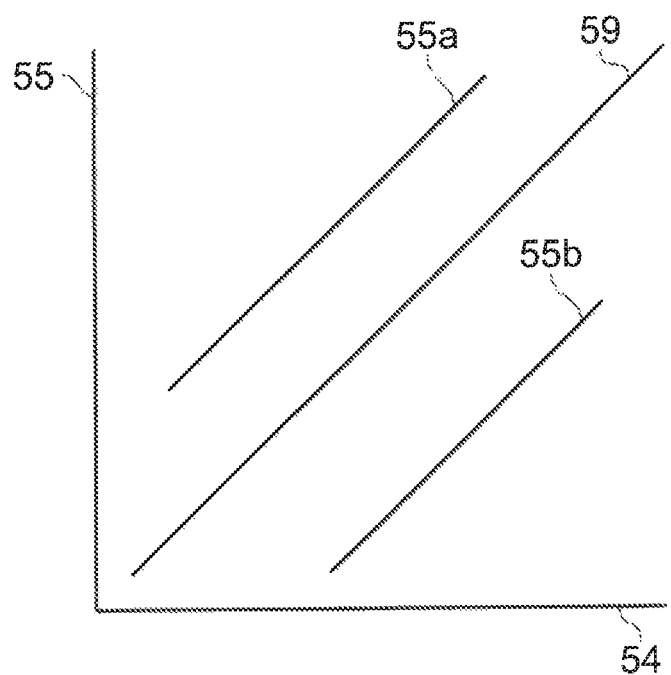
FIG. 4 illustrates a chart showing second pressure of fluid within a bleed line against compressor entry pressure; and, FIG. 5 illustrates a process according to various examples.

According to a pre-determined condition, the valve 40 is determined to be closed when the pressure observed by the second pressure sensor 42 is about equal to the first pressure 54, plus or minus measurement error. The valve 40 is determined to be open when the pressure observed by the second pressure sensor 42 is equal to or greater than a detection threshold, also known as a success criterion. The detection threshold represents a second pressure value that is greater than the first pressure 54, plus or minus measurement error. Additionally, safety margins can be used to define the detection threshold (by multiplying the second pressure 55 by a safety factor of at least 1) to determine whether the second pressure 55 exceeds the first pressure 54 to an extent that measurement error can be excluded. Using safety margins, the valve 40 can be determined to be in an open position when the second pressure 55 observed by the second sensor 42 is about equal to or higher than 1.01 times the first pressure 54. Alternatively, the valve 40 can be determined to be in an open position when the second pressure 55 observed by the second sensor 42 is about equal to or higher than 1.05 times the first pressure 54. Alternatively, the valve 40 can be determined to be in an open position when the second pressure 55 observed by the second sensor 42 is about equal to or higher than 1.08 times the first pressure 54. Further safety factor multiplication values may be alternatively or additionally used, FIG. 4 shows a plot of second pressure 55 on the y-axis, against first pressure 54 on the x-axis, FIG. 4 additionally shows plotted data trends defining the second pressure when the valve is closed 55a, a detection threshold 59 with or without a safety factor, and the second pressure when the valve is open 55b. Using a multiplication factor to multiply the first pressure 54 before assessing the second pressure 55 against the first pressure 54 allows reduced sensitivity to temporary fluctuations in pressure at the system source 43 and system sink 44. Temporary fluctuations in engine power can, in certain situations, confuse the anti-icing system 23 due to fluctuations in either the first 54 or second 55 pressures. Such fluctuations can arise due to external influences on the system source 43 and system sink 44 fluid pressures, Thus, the detection threshold 59 can alternatively comprise a value of pressure added to or subtracted from the first pressure 54. Such values can include, for example, first pressure +0.3 psi, or similar. Alternatively, the value could increase or decrease depending on fluid pressures, temperatures or external events experienced within or around the engine 10. Such a detection threshold 59 may be independent of, or in addition to, the multiplier of one or more of the first 54 and second 55 pressures. Such a success detection threshold 59 could additionally include the requirement of two or more successive and consistent pressure measurements to indicate a particular valve 40 condition.

Referring again to FIG. 2, warm fluid is fed into the component 62 following compression, for example from the intermediate pressure compressor compression stage 14, The second pressure 55 is greater than the operational pressure at the exit of the component 62 (i.e. the system sink 44 pressure in the region where the anti-icing system 23 exhausts) when the valve is open. Alternatively, the second pressure 55 is equal to or less than the operational pressure at the exit of the component 62 (i.e. the system sink pressure in the region where the anti-icing system 23 exhausts) when the valve 40 is closed. Additionally or alternatively, second pressure 55 is less than or equal to the operational pressure at the system source 43 when the valve is open.

The controller 24, in conjunction with the anti-icing system 23, can additionally track the time taken for the valve 40 to switch from confirmed closed position to a confirmed open position, or vice versa. Such a time period can be identified by monitoring the delta in second pressure 55 along with the time period taken for the valve 40 to actuate. The controller 24 can, additionally or alternatively, advise of a deteriorating valve 40 by monitoring the second pressure 55 against valve status, that is the reported position of the valve 40. Early identification of a deteriorating valve 40, aids in the prevention of operational disruption due to unplanned repair. Additionally or alternatively, the system 23 can also monitor the time taken for the valve to move from the first position to the second position, so monitoring the time taken for the determined state to match the commanded state of the valve 40. If the time taken for the determined state to match the commanded state is greater than a pre-determined time threshold, the test may additionally provide an indication or warning of valve failure.

Changes in the pressure within the bleed line 60 between the valve 40 and the component 62 arising due to changes in an engine operating condition can also be corrected by the controller 24. Such a correction is accomplished by checking or comparing the first pressure 54 against the second pressure 55. Incorporation of the additional check of the first 54 and second 55 pressure within the anti-icing system removes the requirement to abort the valve 40 state check when observing changes in engine 10 or operating conditions. Incorporation of the additional check of the first 54 and second 55 pressure within the anti-icing system 23 allows the valve 40 status to be detected prior to dispatch of the aircraft. This allows valve 40 status to be advantageously determined as a pre-flight check.

FIG. 5 illustrates a flow diagram of steps according to various examples, wherein:

At block 70, the system determines the first pressure 54 of a fluid flow at a first location within the engine 10. The first pressure 54 is obtained from the first sensor 41, the first pressure 54 representing an actual, calculated, derived or determined value from one or more of known pressures, temperatures and volumes within the engine 10. Thus, the first pressure 54 can be derived using one or more gas laws or equations associating pressure, temperature and volume.

At block 71, the system determines a second pressure 55 of a fluid at a second location within a bleed line located within the engine 10 when the valve is in the first position. The second pressure 55 is representative of the pressure within the bleed line 60 as determined by one or more pressure sensors 42 between the valve 40 and the system sink 44 and/or one or more pressure sensors 42 between the valve 40 and the system source 43. Where one or more sensors 42 are located on either side of the valve 40, the second pressure sensor 42 can measure the second pressure 55 delta across the valve 40, within the bleed line 60, or within the anti-icing manifold 61. Where one or more sensors 42 are located between the valve 40 and the system sink 44 only, the second pressure sensor 42 can measure the second pressure 55 within the bleed line 60, or within the anti-icing manifold 61, depending on sensor 42 locations.

At block 72, the system compares the first pressure 54 and the second pressure 55. In this step, by comparing the second pressure 55 observed by the second sensor 42 with the first pressure 54 observed by the first sensor 41, the test determines whether there is any difference or delta between the first pressure 54 and the second pressure 55 when the valve 40 is in the first position.

At block 73, the system determines the state of the valve 40. In this step, the test determines whether the second pressure 55 is equal to, greater than, or less than the first pressure 54 to determine the state of the valve. Where the second pressure 55 is equal to or less than the pressure at the system sink 44, the valve is determined to be closed. Conversely, the valve 40 is determined to be at least partially open when the second pressure 55 is at least partially greater than the first pressure 54 to the extent that measurement error can be excluded.

Further optional steps of the system follow.

In addition to the step described at block 73, the system can also monitor the time taken for the valve to move from the first position to the second position, providing an indication or warning of valve failure.

At block 74, the system commands the valve 40 to move from the first position towards a second position. In this step, the system 23 and/or controller 24 commands the valve 40 to move from the first position towards the second position by actuation of the valve actuator 63. The first and second positions relate to closed and open positions respectively. However, the first and second positions could alternatively relate to any position between an open and closed position as required by the anti-icing system 23. Alternatively, the first and second positions could relate to open and closed positions respectively, or any position between an open and closed position as required by the anti-icing system 23.

At block 75, the system determines the second pressure 55 of the compressed fluid at the second location when the valve 40 has been commanded towards the second position. In this step, step 71 is repeated to determine the second pressure 55 when the valve 40 has been commanded to move towards the second position. The one or more second pressure sensors 42 communicate the second pressure 55 to the system controller 24 for comparison and/or further analysis.

At block 76, the system compares the pressure at the second location when the valve 40 is in the first position to the pressure at the second location when the valve 40 has been commanded to move towards the second position. In this step, comparing the second pressure 55 when the valve 40 has been commanded to move towards the second position allows the test to determine whether there is any difference or delta between the second pressure 55 when the valve 40 is in the first position and when the valve 40 is in the second position.

At block 77, the system determines whether the valve 40 has moved from the first position towards the second position when commanded to do so. In this step, monitoring the second pressure 55 allows the system 23 to monitor pressure changes within the bleed line 60 when cycling the valve 40 between a first and second position, or vice versa. The observation of a pressure change, or delta, by the second sensor 42 following a command to move the valve 40 from a first position to a second position provides a confirmation of valve 40 function.

By comparing the second pressure 55 when cycling between a first and second position with the first pressure 54, the test determines whether the valve 40 is operational, that is cycling between open and closed with a corresponding change in observed pressure. Alternatively, the test determines that the valve 40 is stuck, that is in a single position which is perceived by the valve actuation system to be open or closed with little or no change in observed pressure, or change in observed pressure difference. The test additionally determines whether the valve 40 is stuck in an open configuration, or stuck in a closed configuration.

If the test determines that the valve 40 is operational, that is cycling between a position which is perceived by the system 23 to be open and closed with an identifiable change in observed pressure, the system loops back to step 70 for the following check.

At block 78, the system provides an alert if no change in pressure, and thus no change of valve 40 state, is detected. In this step, an alert is provided if the change in second pressure 55 does not meet the required detection threshold 59. A change in second pressure 55 which does not meet the required detection threshold 59 indicates that the valve 40 has not moved from the first position to the second position as intended. In this way, the system provides a diagnosis of a faulty valve 40 contained within the anti-icing system 23.

The steps conducted by the system as described in FIG. 5 are conducted 'online', where data from the components included as part of the system is fed into the controller 24 and/or system 23 by wired electrical, or wireless electromagnetic connection for further analysis. Alternative arrangements may be provided where the steps conducted by the system illustrated in FIG. 5 are performed 'offline' on data which has been measured and recorded previously, or sent via a data link to an external controller 24 and/or system 23. In either case, the analysis and control of the system 23 is performed in 'real-time', that is, substantially at the same time that the data is measured. In this case, the controller 24 is coupled to the engine 10 and can be an electronic engine controller 31 or another on-board processor. Where the engine 10 powers an aircraft, the controller 24 could be included as part of an engine controller 31, a processor on-board the engine 10, or a processor on-board the aircraft itself.

It will be understood that the invention is not limited to the embodiments above-described and various modifications and improvements can be made without departing from the concepts described herein.

Except where mutually exclusive, any of the features may be employed separately or in combination with any other features and the disclosure extends to and includes all combinations and sub-combinations of one or more features described herein.

The invention claimed is:

1. A system to determine an error state relating to operation of a valve, the system comprising a controller configured to:

a) determine a first pressure of a fluid flow at a first location in a bleed line within a gas turbine engine, the first location in the bleed line being located upstream in the fluid flow of the bleed line from the valve;

b) determine a second pressure of a compressed fluid at a second location in the bleed line within the gas turbine engine when the valve is in a first position, the second location in the bleed line being located downstream in the fluid flow of the bleed line from the valve;

c) prior to commanding the valve to move, compare the first pressure and the second pressure to determine a current state relating to the operation of the valve, the current state of the valve being determined based on a predetermined pressure threshold;

d) command the valve to move from the first position towards a second position;

e) determine the second pressure of the compressed fluid at the second location;

f) subsequent to commanding the valve to move, compare the determined second pressure at the second location when the valve is in the first position to the determined second pressure at the second location when the valve has been commanded to move towards the second position; and g) determine whether the valve has moved from the first position towards the second position in response to being commanded to move from the first position to the second position.

2. The system as claimed in claim 1, wherein the second location includes a bleed line.

3. The system as claimed in claim 2, wherein step f) includes determining a change in pressure within the bleed line.

4. The system as claimed in claim 3, wherein the controller is configured to declare a fault condition when the change in pressure within the bleed line is equal to zero.

5. The system as claimed in claim 3, wherein the controller is configured to declare a fault condition when a change in a pressure difference between the first pressure at the first location and the second pressure at the second location is equal to zero.

6. The system as claimed in claim 2, wherein the bleed line is configured to extend from a compressor exit flow to a component.

7. The system as claimed in claim 1, wherein the controller is additionally configured to:

measure an initial fluid pressure at a third location within the gas turbine engine; and determine the first pressure from the initial fluid pressure.

8. The system as claimed in claim 1, further comprising a first sensor located within the fluid flow at the first location within the gas turbine engine, the first sensor being configured to measure the first pressure, the first sensor being in communication with the controller.

9. The system as claimed in claim 8, further comprising a second sensor located at the second location within the gas turbine engine, the second sensor being configured to measure the second pressure at the second location, the second sensor being in communication with the controller.

10. The system as claimed in claim 1, wherein the controller is configured to declare a fault condition when a difference between the second pressure at the second location when the valve is in the first position and the second pressure at the second location when the valve is in the second position is equal to zero.

11. The system as claimed in claim 1, wherein the controller is configured to declare a fault condition when a change in a pressure difference between the first pressure at the first location and the second pressure at the second location is equal to zero.

12. The system as claimed in claim 1, wherein the controller is configured to determine the first pressure from an initial fluid pressure at a third location within the gas turbine engine.

13. A gas turbine engine comprising:
a bleed line;
the valve located within the bleed line to control flow through the bleed line;
a first pressure sensor located within the gas turbine engine;
a second pressure sensor located within the bleed line; and
the system according to claim 1, the controller being further configured to receive the first pressure reading from the first pressure sensor and the second pressure reading from the second pressure sensor.

14. A system to determine an error state relating to operation of a valve, the system comprising a controller including a processor, the processor being configured to:
a) determine a first pressure of a fluid flow at a first location in a bleed line within a gas turbine engine, the first location in the bleed line being located upstream in the fluid flow of the bleed line from the valve;
b) determine a second pressure of a compressed fluid at a second location in the bleed line within the gas turbine engine when the valve is in a first position, the second location being located downstream in the fluid flow of the bleed line from the valve;
c) prior to commanding the valve to move, compare the first pressure and the second pressure to determine a current state relating to the operation of the valve, the current state of the valve being determined based on a predetermined pressure threshold;
d) command the valve to move from the first position towards a second position;
e) determine the second pressure of the compressed fluid at the second location;
f) subsequent to commanding the valve to move, compare the determined second pressure at the second location when the valve is in the first position to the determined second pressure at the second location when the valve has been commanded to move towards the second position; and
g) determine whether the valve has moved from the first position towards the second position in response to being commanded to move from the first position to the second position.

15. A method to determine an error state relating to operation of a valve, the method comprising steps to:
a) determine a first pressure of a fluid flow at a first location in a bleed line within a gas turbine engine, the first location in the bleed line being located upstream in the fluid flow of the bleed line from the valve;
b) determine a second pressure of a compressed fluid at a second location in the bleed line within the gas turbine engine when the valve is in a first position, the second location in the bleed line being located downstream in the fluid flow of the bleed line from the valve;
c) prior to commanding the valve to move, compare the first pressure and the second pressure to determine a current state relating to the operation of the valve, the current state of the valve being determined based on a predetermined pressure threshold;
d) command the valve to move from the first position towards a second position;
e) determine the second pressure of the compressed fluid at the second location;
f) subsequent to commanding the valve to move, compare the determined second pressure at the second location when the valve is in the first position to the determined second pressure at the second location when the valve has been commanded to move towards the second position; and
g) determine whether the valve has moved from the first position towards the second position in response to being commanded to move from the first position to the second position.

* * * * *